R. E. POINDEXTER.
Saw-Sets.
No. 129,249.             Patented July 16, 1872.
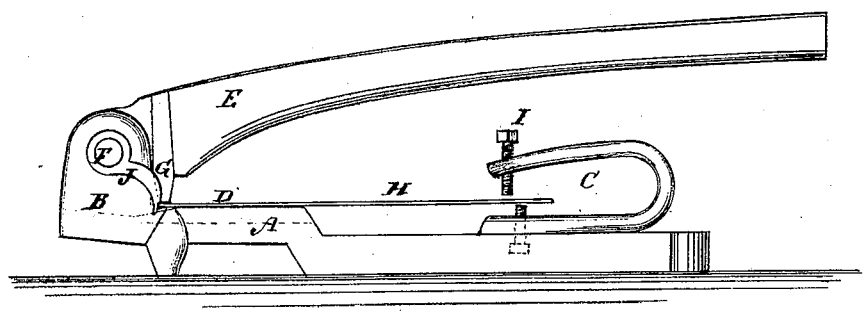
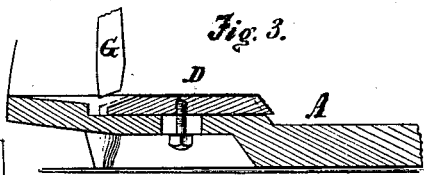
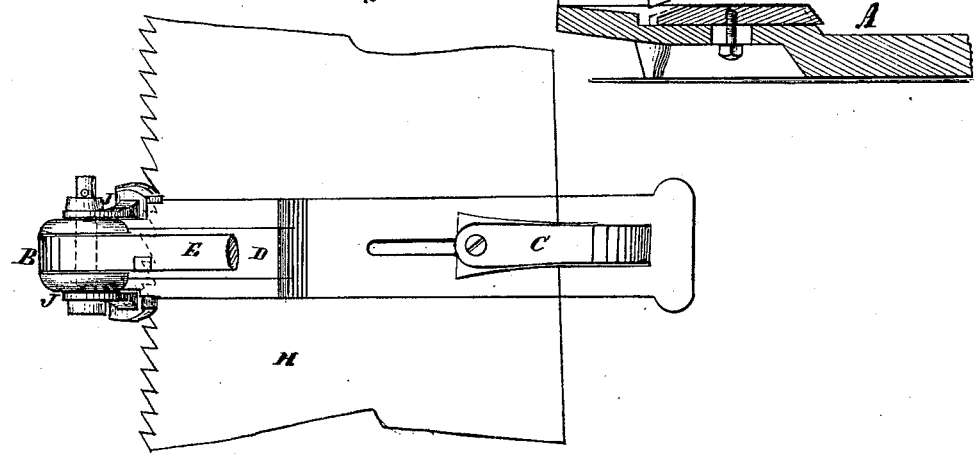

129,249

UNITED STATES PATENT OFFICE.

ROBERT E. POINDEXTER, OF ANDERSON, INDIANA.

IMPROVEMENT IN SAW-SETS.

Specification forming part of Letters Patent No. 129,249, dated July 16, 1872.

Specification describing a new and useful Improvement in Saw-Sets, invented by ROBERT E. POINDEXTER, of Anderson, in the county of Madison and State of Indiana.

This invention relates to that class of saw-sets in which an oscillating punch or die is employed to bend the saw-teeth over a beveled surface of a stationary die-plate. To give a proper and uniform set to the teeth it is necessary that at the moment when the tooth is clamped between the punch and die-plate their beveled surfaces should be parallel to each other. To obtain this result in operating upon saw-blades differing in thickness is the object of my improvement, which consists in making the die-plate adjustable horizontally and in the direction of its beveled surface.

In the accompanying drawing, Figure 1 represents a side view of the instrument. Fig. 2 is a top or plan view, showing a saw as when being set. Fig. 3 is a sectional view, showing the adjustability of the die-plate.

Similar letters of reference indicate corresponding parts.

A is the bed, which extends back from the head B, and is slotted to receive the adjustable guide C. D is the die-plate, which is grooved into the bed A, so that it can be readily adjusted to suit different saws, or removed for repairs or other purposes.

It will be observed that when the beveled surfaces of the die G and die-plate D are parallel to each other there will be a narrow space between them. The width of this space may be adjusted by moving the die-plate endwise in its seat in the bed to receive the teeth of saws differing in thickness.

E is the operating-lever, the fulcrum of which is at the point F in the head B. G is the die, which is grooved into the lever, as seen in Fig. 1. H represents the saw, which rests upon the bed A, its back being held between the adjustable screws I I of the guide C, as seen in Fig. 1. The bed A, near the head B, is beveled downward, over the obtuse angle of which the teeth of the saw project for receiving the set. The end of the die is made parallel with this bevel, so that when the die is pressed down by means of the lever the teeth of the saw, one after another, are set as the saw is moved along over the bed. J J are adjustable guides, connected with the head B, by which the distance which the teeth are allowed to project over the bevel angle is regulated. In Fig. 2 the bed and the die-plate are seen as though the saw was transparent, the lever being broken off.

The saw-set is adapted for all saws. For very narrow saws the saw-plate is held to the bed by hand or in any convenient manner.

I do not confine myself to the precise form or arrangement of any of the parts described, as they may be varied in many ways without departing from my invention.

Having thus described my invention, I claim as new and desire to secure by Letters Patent—

The punch or die G, in combination with the die-plate D, which is adjustable in the direction of its bevel, substantially as and for the purpose specified.

ROBERT E. POINDEXTER.

Witnesses:
C. D. THOMPSON,
J. T. SMITH.